United States Patent

Wenzlawski et al.

[11] Patent Number: 5,900,540
[45] Date of Patent: May 4, 1999

[54] METHOD FOR DETERMINING THE COMPRESSION IN THE CYLINDER OF A SUPERCHARGED INTERNAL COMBUSTION ENGINE WITH DIRECT INJECTION

[75] Inventors: Klaus Wenzlawski, Nürnberg; Arno Friedrich, Regensburg, both of Germany

[73] Assignee: Siemens Aktiengesellschaft, Munich, Germany

[21] Appl. No.: 09/069,450

[22] Filed: Apr. 29, 1998

[30] Foreign Application Priority Data

Apr. 29, 1997 [DE] Germany ............... 197 18 172

[51] Int. Cl.$^6$ ............... G01L 23/24; G01M 15/00
[52] U.S. Cl. ............... 73/115; 73/118.2; 701/101
[58] Field of Search ............... 73/115, 118.2, 73/116, 117.2, 117.3, 119 A; 701/100, 101, 104, 103

[56] References Cited

U.S. PATENT DOCUMENTS

| 4,505,152 | 3/1985 | Haddox | 73/115 |
| 4,633,707 | 1/1987 | Haddox | 73/115 |
| 4,984,456 | 1/1991 | Takahashi | 73/118.2 |
| 5,012,422 | 4/1991 | Takahashi et al. | 73/118.2 |
| 5,377,112 | 12/1994 | Brown et al. | 701/100 |
| 5,546,795 | 8/1996 | Yamagishi | 73/116 |

FOREIGN PATENT DOCUMENTS

3621307C2  1/1991  Germany.

*Primary Examiner*—George Dombroske
*Attorney, Agent, or Firm*—Herbert L. Lerner; Laurence A. Greenberg

[57] ABSTRACT

Maximum compression in the cylinder of an internal combustion engine is ascertained from the values for the maximum compression in the cylinder in overrunning operation of the engine and a ratio of the charge pressures in operation under load and in overrunning operation.

8 Claims, 3 Drawing Sheets

5,900,540

METHOD FOR DETERMINING THE COMPRESSION IN THE CYLINDER OF A SUPERCHARGED INTERNAL COMBUSTION ENGINE WITH DIRECT INJECTION

BACKGROUND OF THE INVENTION

1. Field of the Invention

The invention relates to a method for determining the compression in the cylinder of a supercharged, directly injected internal combustion engine with a high-pressure reservoir, from which fuel is delivered to an injector, and a supercharger for increasing the air throughput by compressing the aspirated air for the engine.

Internal combustion engines with direct injection are very promising with regard to reducing fuel consumption with relatively low pollutant emissions. In contrast to intake tube injection, in direct injection fuel is injected at high pressure directly into the combustion chamber.

Injection systems with a central pressure reservoir (common rail) are known in the prior art. In those so-called common rail systems, a fuel pressure regulated by an electronic control unit of the engine, via pressure sensors and pressure regulators, is built up in the common rail and is available largely independently of the engine speed (rpm) and the injection quantity. The fuel is injected into the combustion chamber via an electrically driven injector. The injector receives its signals from the control unit.

By functionally separating the pressure generation and the injection, the injection pressure can be selected largely freely, regardless of the current operating point of the engine.

Modern electronically controlled injection systems for diesel engines are time-controlled, as compared with the old mechanically controlled systems. In the latter, the reference point is the compressed volume and they moreover have a fixed relationship between the feed rate and the engine speed, and hence a fixed relationship between the injection pressure and the speed. This means that in conventional systems, with the same adjustment of the quantity adjusting mechanism, the same fuel volume is always injected regardless of the ambient conditions prevailing at the time. By comparison, in time-controlled systems, a triggering time must be ascertained on the basis of a calculated injection mass.

In common rail systems, in which the injection pressure can accordingly be adjusted independently of the operating point of the engine, the injector triggering time required for a particular injection mass is dependent, under constant ambient conditions, on the pressure drop prevailing just at that time at the injector, i.e. the injection nozzle. This pressure drop is the difference between the rail pressure $p_{rail}$ in the high-pressure reservoir and the pressure in the combustion chamber, that is, the cylinder pressure $p_{cyl}$.

To calculate the triggering time for the injector, the pressure drop $\Delta p = p_{rail} - p_{cyl}$ at the injector must accordingly be taken into account. To that end, the rail pressure and the compression in the cylinder must be known, if at all possible at the instant of injection onset.

The rail pressure is measured with a pressure sensor and made available to the electronic control unit of the engine for further processing. Conversely, typically there is no sensor present for measuring the compression, so that the pressure in the cylinder has to be calculated on the basis of known variables.

SUMMARY OF THE INVENTION

It is accordingly an object of the invention to provide a method of determining a compression in a cylinder of a supercharged internal combustion engine with direct injection, which overcomes the above-mentioned disadvantages of the prior at devices and methods of this general type and which allows such determinations in a simple manner.

With the foregoing and other objects in view there is provided, in accordance with the invention, a method for determining the compression in a cylinder of a direct-injection internal combustion engine, wherein fuel is delivered to an injector from a high-pressure reservoir, and an air throughput is increased with a supercharger compressing aspirated air for the engine, the method which comprises:

determining a maximum compression in a cylinder of the internal combustion engine in overrunning operation of the engine;

determining a charge pressure in engine operation under load and a charge pressure in overrunning operation of the engine; and ascertaining a maximum compression in the cylinder from the maximum compression in the cylinder in overrunning operation and a ratio between the charge pressures in engine operation under load and in overrunning operation.

In other words, the maximum compression in the cylinder is ascertained from the values for the maximum compression in the cylinder in overrunning mode and the ratio between the charge pressures in engine operation under load and in overrunning operation of the engine. This has the advantage that the maximum compression can be calculated with very high accuracy, without using an additional pressure sensor in the combustion chamber, by utilizing a measurement obtained on the test bench in the overrunning state of the engine and by measuring the charge pressure during engine operation. The latter is required anyway for regulating the supercharger.

In accordance with an added feature of the invention, the maximum compression in the cylinder is calculated with the following equation:

$$p_{cylmax} = \frac{p_L}{p_{Loverrun}} * p_{cylmaxoverrun}$$

where $p_{cylmax}$ is the maximum compression in the cylinder, $p_L$ is the charge pressure in engine operation under load, $p_{Loverrun}$ is the charge pressure in the overrunning operation, and $p_{cylmaxoverrun}$ is the maximum compression in the cylinder in the overrunning operation.

In accordance with an additional feature of the invention, the charge pressure is determined by measuring the charge pressure with a pressure sensor.

In accordance with another feature of the invention, there is stored, in a characteristic map of a memory of an electronic control unit, values for the maximum compression in the cylinder in overrunning operation and for the charge pressure in overrunning operation of the engine as a function of an engine speed.

In accordance with a further feature of the invention, the values representing the maximum compression and the charge pressure are stored in respectively separate maps. In the alternative, the values may be stored as a quotient in a common map.

In accordance with again another feature of the invention, for injection onsets shifted far prior to top dead center, the compression at an onset of injection is calculated by multiplying a value for the maximum compression in the cylinder by a factor dependent on a relative compression and on a crankshaft angle.

In accordance with a concomitant feature of the invention, a course of the relative compression is stored in a map as a function of the crankshaft angle.

Other features which are considered as characteristic for the invention are set forth in the appended claims.

Although the invention is illustrated and described herein as embodied in a method for determining the compression in the cylinder of a supercharged internal combustion engine with direct injection, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

Figure 1:
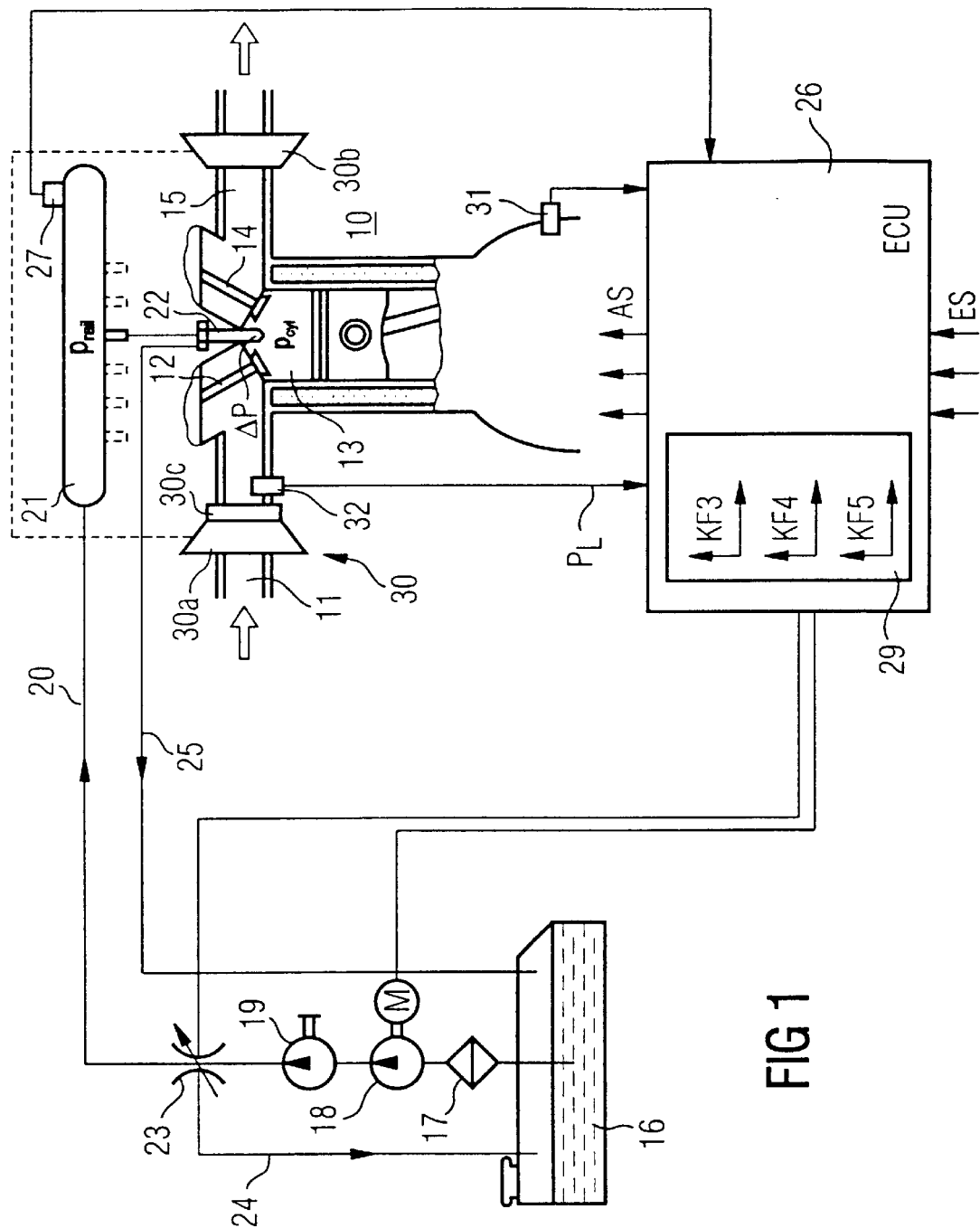
FIG. 1 is a block diagram of a direct-injection internal combustion engine with a high-pressure reservoir and an associated control unit.

Referring now to the figures of the drawing in detail and first, particularly, to FIG. 1 thereof, there is seen a block diagram illustrating the technical field in which the invention is employed. Only those parts necessary for the comprehension of the invention are shown. Reference numeral 10 indicates a diesel engine, which is supplied with the requisite air for combustion via an intake line 11 and an inlet valve 12. A piston, not identified by reference numeral, together with the inner walls of the cylinder defines a combustion chamber 13. The exhaust gas flows via an outlet valve 14 into an exhaust gas duct 15.

To increase cylinder filling and thus to increase the power of the engine 10, an exhaust turbocharger 30 is provided, whose turbine wheel 30b is disposed in the exhaust gas duct 15 and is operatively connected, via a shaft represented by a dashed line without a reference numeral, with a compressor wheel 30a in the intake duct 11. The exhaust gases thus drive the turbine, which in turn drives the compressor. The compressor takes over the task of aspiration and furnishes the engine with a precompressed fresh charge. A charge air cooler 30c downstream of the compressor dissipates the heat of compression via the engine coolant loop. As a result, the cylinder filling can be improved still further.

To adapt the exhaust turbocharger to the requirements of the engine, the charge pressure of the supplied, compressed fresh air is regulated with the aid of a charge air regulating device that is known per se and therefore not shown here. Thus the engine is protected against excessively high charge pressures, as a function of the operating state and ambient conditions. At the same time, the speed of the turbocharger can be limited, thus lengthening its service life.

The charge pressure $p_L$ is detected by an appropriate pressure sensor 32 in the intake line 11 downstream of the charge air cooler 30c. The output signal of the sensor 32 is carried on to the electronic control unit 26. The control unit is also supplied with an output signal, corresponding to the engine speed N (rpm), of an rpm sensor 31.

The injection system has a fuel tank 16, which communicates via a fuel filter 17 and a prefeed pump 18 with a high-pressure pump 19, which pumps fuel at high pressure into a high-pressure line 20. The high-pressure line 20 is connected to an injection strip 21, which has injectors 22 in the form of injection nozzles, which inject fuel into the combustion chambers of the engine. The injection strip 21 is preferably embodied as a common rail high-pressure reservoir.

The high-pressure line 20 has a driven pressure control element 23, which by way of example is a regulated pump or a pressure regulating valve, and which communicates with the fuel take 16 via a bleed line 24. The injectors 22 are connected to a second bleed line 25, which also leads to the fuel tank 16. The pressure control element 23 communicates with an electronic control unit (ECU) via a trigger line, not identified by reference numeral. The prefeed pump 18 communicates with the electronic control unit in the same way. The high-pressure pump 19 can be driven by the engine itself, for instance by the crankshaft, or electrically. The control unit 26 also communicates with a pressure sensor 27, which is disposed on the injection strip (common rail) 21 and which detects the fuel pressure $p_{rail}$ in the injection strip 21 and thus in the high-pressure region. The control unit 26 also has access to a memory 29, in which among other things map KF3, KF4 and KF5 are stored. It also has other, generally designated inputs ES, by way of which data of the engine that are required for its operation, such as the load or temperature, are delivered. Other output variables of the control unit for triggering various actuators are identified by the symbol AS.

The general function of this kind of direct-injection system with a high-pressure reservoir is known and will therefore not be described in detail here.

It will be explained below how the pressure in the cylinder can be ascertained.

In non-supercharged engines it suffices if the maximum value of the compression or a characteristic curve of the compression over the crankshaft angle is stored in a memory of the electronic control unit of the engine. In supercharged engines, the peak compression already varies in the overrunning state over the speed range, since the exhaust turbocharger causes a slight elevation in pressure at high engine speed. If the engine is driven under load, the peak compression varies as a function of the charge pressure.

The following relationship exists between the peak compressions and the associated charge pressures:

$$\frac{p_{cylmax}}{p_{cylmaxoverrun}} = \frac{p_L}{p_{Loverrun}}$$

where $p_{cylmax}$ is the maximum compression in engine operation under load;

$p_{cylmaxoverrun}$ is the maximum compression in overrunning engine operation;

$p_L$ is the charge pressure; and $p_{Loverrun}$ is the charge pressure in overrunning engine operation.

From this, the current peak compression is calculated:

$$p_{cylmax} = \frac{p_L}{p_{Loverrun}} * p_{cylmaxoverrun}$$

While the charge pressure $p_L$ is measured continuously by means of the pressure sensor 32, the values $p_{cylmaxoverrun}$ and $p_{loverrun}$ are stored as a function of the engine rpm N in a memory 29 of the control unit 26. The values can either be stored each in their own map KF3, KF4, or in combined form as the quotient $$\frac{p_{cylmaxoverrun}}{p_{Loverrun}}$$

in one common map.

The peak compression thus ascertained is approximately sufficient to represent the compression at top dead center TDC (±10 ° KW). For injection onsets shifted far earlier than TDC, such as in the case of preinjection, the compression at the onset of injection can be calculated from the peak compression as follows:

The relative course of the compression, $$\frac{p_{cyl}}{p_{cylmax}},$$

over the crankshaft angle is the same for all speed values and all charge pressures. This course is stored in a map KF5 of the memory 29. From this map KF5, as a function of the crankshaft angle, the factor pertaining to the current injection onset is selected and multiplied by the previously calculated peak compression.

Figure 2:
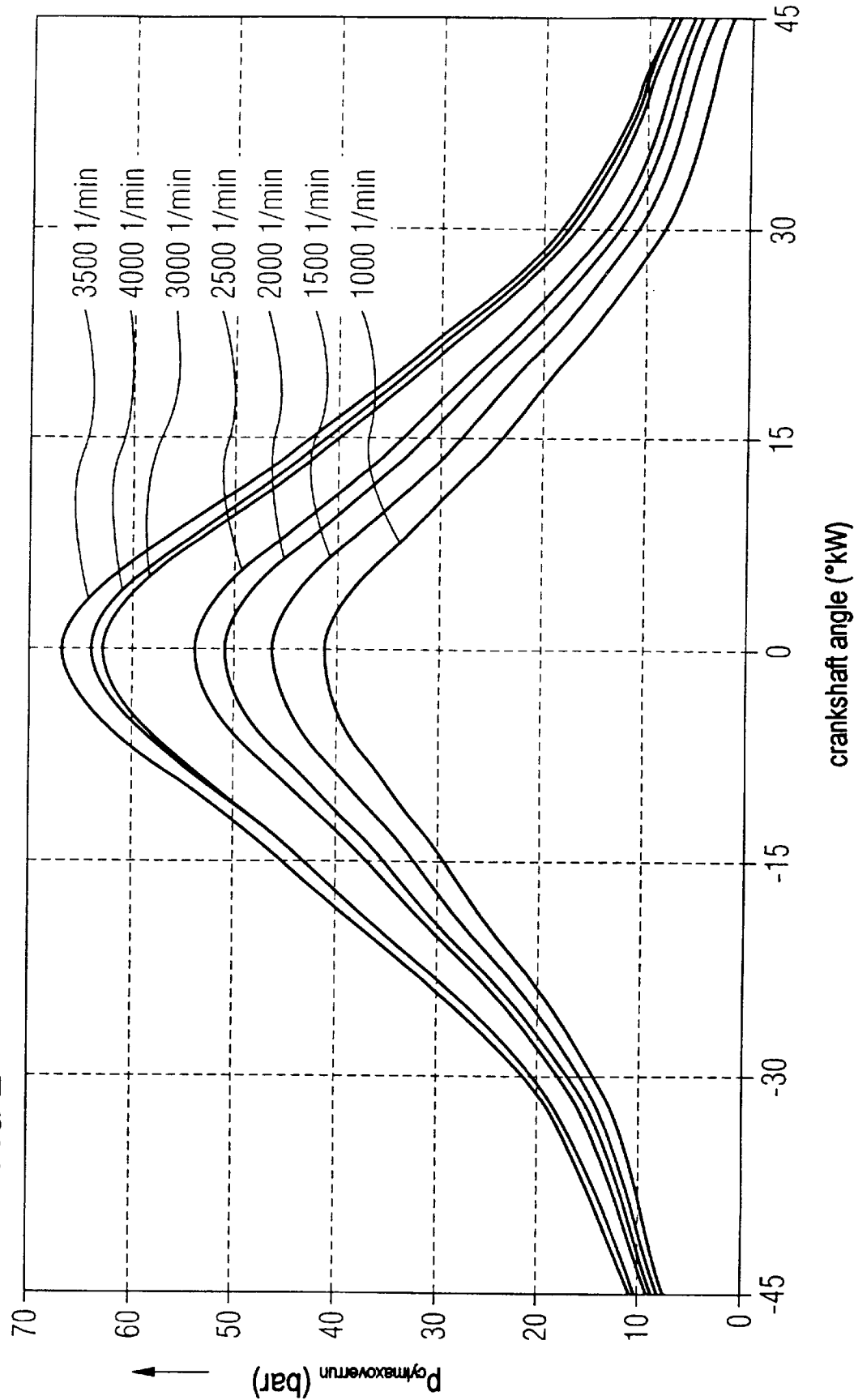
FIG. 2 is a graph charting the course of the cylinder pressure in overrunning engine operation.
Figure 3:
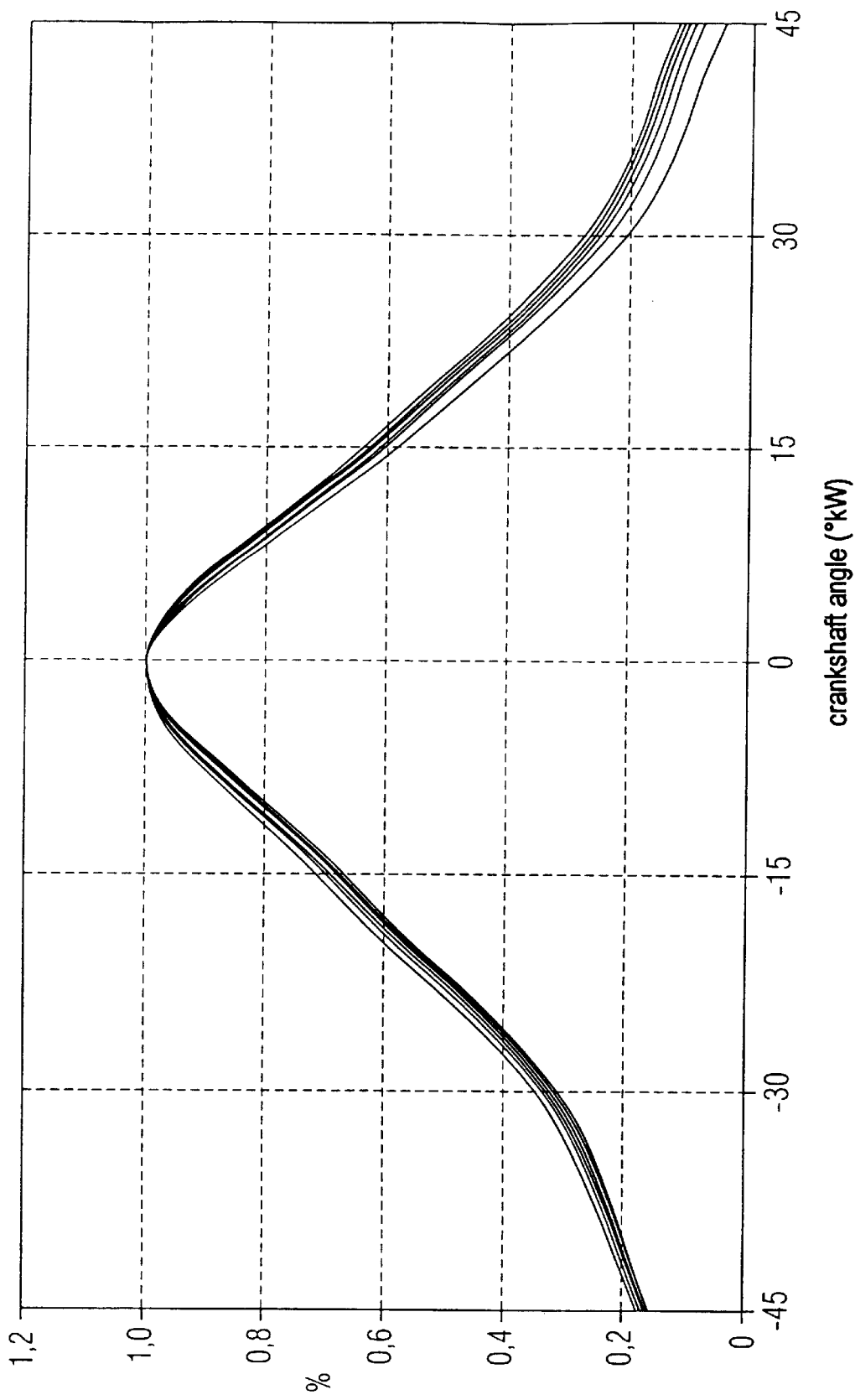
FIG. 3 is a graph of the course of the relative cylinder pressure, again in overrunning engine operation.

In FIG. 2, the course of the cylinder pressure $p_{cylmaxoverrun}$ in overrunning operation of the engine is shown as a function of the crankshaft angle for various speed values, while FIG. 3 shows the course of the relative cylinder pressure, again as a function of the crankshaft angle.

With the aid of the compression thus ascertained, the pressure drop Δp above the injection nozzle can be calculated as follows:

$$\Delta p = p_{rail} - p_{cyl}$$

The pressure difference Δp can then be taken into account in calculating the triggering time for the injector, as disclosed for instance in our concurrently filed, copending application No. (Atty. Docket GR 97 P 1543, German application DE 197 18 171.6), which is herewith incorporated by reference.

The method according to the invention has been explained above in terms of a direct-injection diesel engine with a high-pressure reservoir; but it is equally well suited to an Otto engine operating with high-pressure injection and a common rail, in which the pressure difference at the injection valve is to be taken into account in determining the injection time.

We claim:

1. A method for determining the compression in a cylinder of a direct-injection internal combustion engine, wherein fuel is delivered to an injector from a high-pressure reservoir, and an air throughput is increased with a supercharger compressing aspirated air for the engine, the method which comprises:

determining a maximum compression in a cylinder of the internal combustion engine in overrunning operation of the engine;

determining a charge pressure in engine operation under load and a charge pressure in overrunning operation of the engine; and ascertaining a maximum compression in the cylinder from the maximum compression in the cylinder in overrunning operation and a ratio between the charge pressures in engine operation under load and in overrunning operation.

2. The method according to claim 1, wherein the ascertaining step comprises calculating the maximum compression in the cylinder with the following equation:

$$p_{cylmax} = \frac{p_L}{p_{Loverrun}} * p_{cylmaxoverrun}$$

where $p_{cylmax}$ is the maximum compression in the cylinder, $p_L$ is the charge pressure in engine operation under load, $p_{Loverrun}$ is the charge pressure in the overrunning operation, and $p_{cylmaxoverrun}$ is the maximum compression in the cylinder in the overrunning operation.

3. The method according to claim 1, wherein the step of determining the charge pressure comprises measuring the charge pressure with a pressure sensor.

4. The method according to claim 1, which comprises storing in a characteristic map of a memory of an electronic control unit values for the maximum compression in the cylinder in overrunning operation and for the charge pressure in overrunning operation of the engine as a function of an engine speed.

5. The method according to claim 4, wherein the storing step comprises storing the values representing the maximum compression and the charge pressure respectively in separate maps.

6. The method according to claim 4, wherein the storing step comprises storing the values representing the maximum compression and the charge pressure as a quotient in a common map.

7. The method according to claim 1, which further comprises, for injection onsets shifted far prior to top dead center, calculating the compression at an onset of injection by multiplying a value for the maximum compression in the cylinder by a factor dependent on a relative compression and on a crankshaft angle.

8. The method according to claim 7, which comprises storing a course of the relative compression in a map as a function of the crankshaft angle.

* * * * *